No. 648,764. Patented May 1, 1900.
J. H. LAMPREY.
APPARATUS FOR PRODUCING OZONE BY ELECTRICITY.
(Application filed Dec. 7, 1899.)
(No Model.)

Witnesses:

Inventor
Joshua H. Lamprey

UNITED STATES PATENT OFFICE.

JOSHUA HENRY LAMPREY, OF LONDON, ENGLAND.

APPARATUS FOR PRODUCING OZONE BY ELECTRICITY.

SPECIFICATION forming part of Letters Patent No. 648,764, dated May 1, 1900.

Application filed December 7, 1899. Serial No. 739,546. (No model.)

*To all whom it may concern:*

Be it known that I, JOSHUA HENRY LAMPREY, a subject of the Queen of Great Britain, residing at Brockley, London, England, have invented a new and useful Improvement in Apparatus for the Production of Ozone by Electricity, of which the following is a specification.

My invention consists of the improvement hereinafter described in a type of ozonizers or apparatus for the production of ozone by electricity of which I am the inventor and in which the ozone is produced by the passage of alternating currents of electricity between conductors arranged in pairs and separated by glass or other dielectric material, (which I will designate the "separators,") one conductor of each pair (which I will designate the "discharge-conductor") being formed of a wire having strung on it beads or disks of metal and beads of glass or other material, disposed alternately, and the other conductor of each pair (which I will designate the "plain" conductor) consisting of a strip or rod of metal. In such discharge-conductors as formerly made by me the metal beads or disks (which I will designate the "discharge" members) were of larger diameter than the beads of glass or other material, (which I will term the "intervening" members,) the object being to insure contact between the discharge members and the separators. Now I have since discovered that the production of ozone may be considerably increased by supporting the discharge members at a slight distance from the surface of the separators, and my aforesaid improvement consists in simple and efficient means for thus supporting the discharge members, the said means consisting in the use in the construction of the discharge-conductors of intervening members of greater diameter than the discharge members, the relative diameters of the two being governed by the distance at which the discharge members are required to be kept from the separators.

My said improvement is illustrated in the accompanying drawings, in which—

Figure 1:
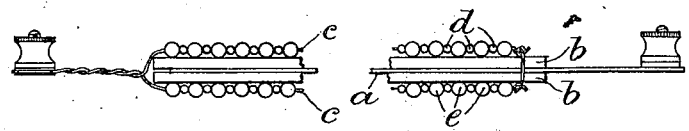
Figure 2:
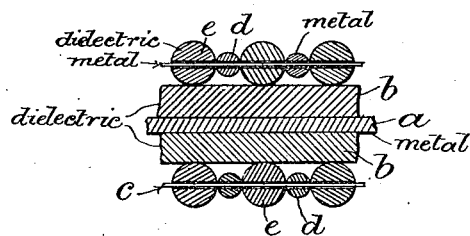

Figure 1 is an elevation; and Fig. 2 is a section on a somewhat larger scale, showing a portion of one form of an ozonizer of the construction hereinbefore referred to having my present improvement applied thereto.

Referring to the said drawings, $a$ is the plain conductor.

$b$ is the dielectric or separator of dielectric material.

$c\, d\, d\, e\, e$ are the parts of the discharge-conductor, $c$ being the wire thereof, $d\, d$ the discharge members, and $e\, e$ the intervening members, which latter are of greater diameter than the discharge members $d\, d$, and therefore support the latter at a slight distance from the surface of the separator $b$.

My present invention is an improvement upon that shown in the British Letters Patent granted me June 19, 1894, No. 11,810.

What I claim as my invention, and desire to secure by Letters Patent, is—

An apparatus for the production of ozone by electricity, consisting of a plain conductor, a discharge-conductor, a series of discharge members strung thereon, a series of intervening dielectric members of greater diameter than the discharge members also strung on said conductor alternately with the discharge members, and a dielectric intervening between the plain conductor and the discharge members and having the dielectric members resting on its surface, substantially as described.

JOSHUA HENRY LAMPREY. [L. S.]

Witnesses:
PERCY CHARLES RUSHEN,
ALFRED DONNISON.